UNITED STATES PATENT OFFICE.

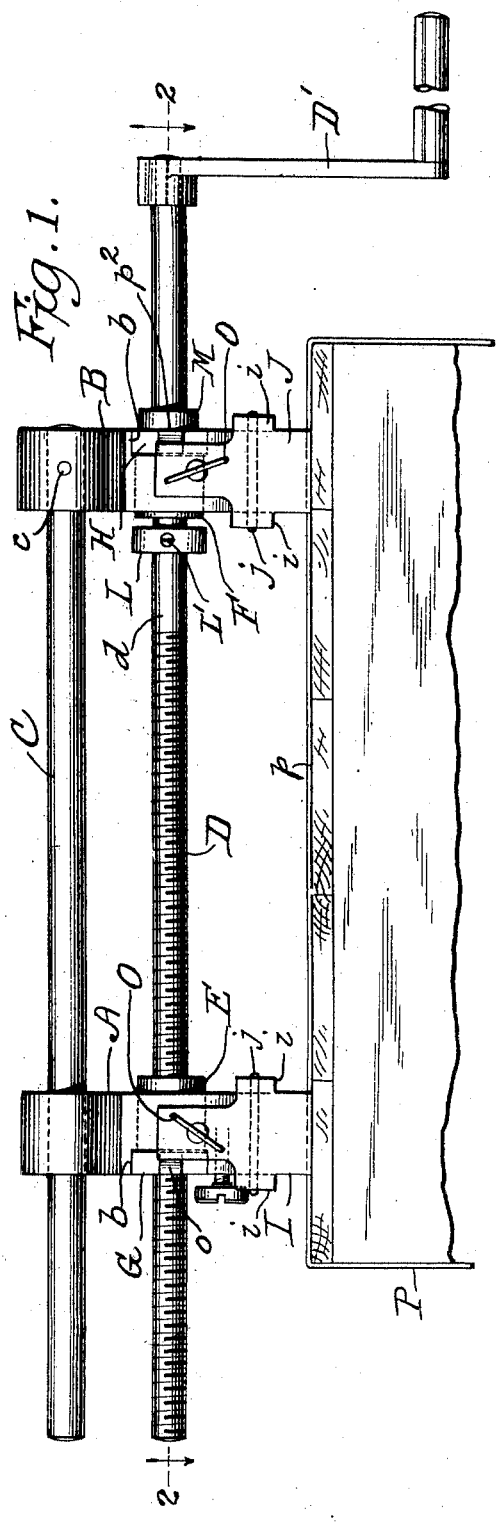
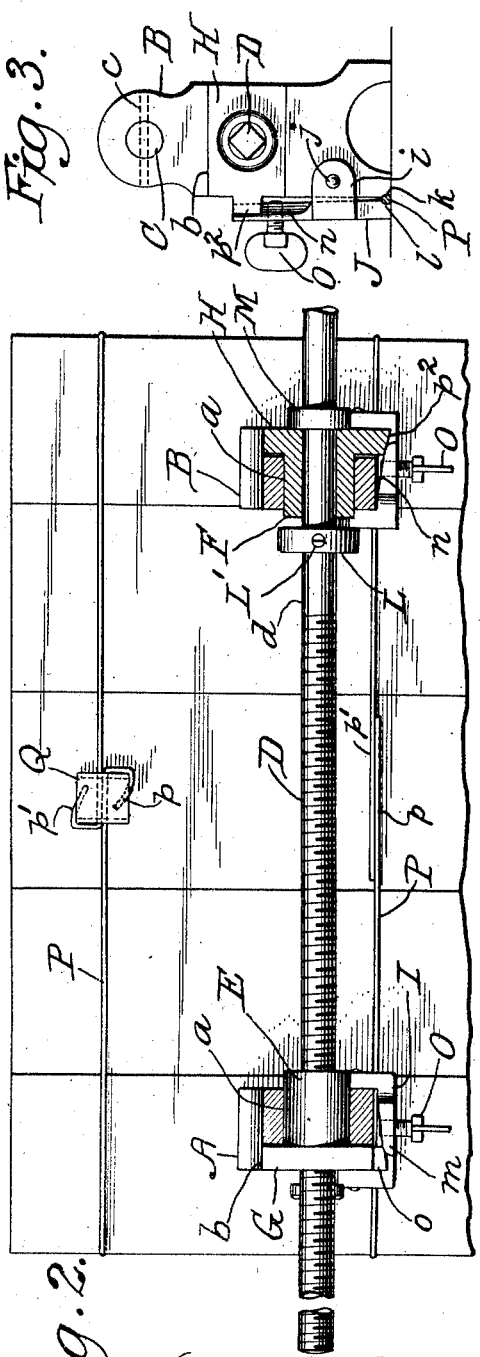

VINCENT RAGONA, OF BROOKLYN, NEW YORK, ASSIGNOR, BY MESNE ASSIGNMENTS, TO CARY MANUFACTURING COMPANY, OF BROOKLYN, NEW YORK, A CORPORATION OF NEW YORK.

BAND-TIGHTENER.

1,367,094.     Specification of Letters Patent.     Patented Feb. 1, 1921.

Application filed January 30, 1918. Serial No. 214,521.

*To all whom it may concern:*

Be it known that I, VINCENT RAGONA, a citizen of the United States, residing at the city of New York, borough of Brooklyn, county of Kings, and State of New York, have invented a certain new and useful Band-Tightener, of which the following is a specification.

This invention is a device adapted for drawing a band tightly around a shipping package, such as a box, case, shook, or any other container.

The object in view is to automatically grip a band, and to stretch it, by the operation of a single instrumentality whereby important functions are secured, such as the expeditious application of the band to the shipping package, said band is gripped so securely that it cannot become released from the stretching device during the operation of placing tension thereon, and the band is stretched to a desired extent with a view to embedding it partially in the material of the shipping package, particularly at the corners thereof, so that the band cannot ordinarily become displaced upon the package and said band operates effectively in binding together the panels, etc., of said shipping package.

In a practical embodiment of the invention, I employ a plurality of members or heads, means for effecting a relative movement between them, and gripping means actuated by said relative-movement so as to initially grip a band and to remain in gripping contact therewith during the relative movement between the heads, whereby a saving in time and labor is effected for the reason that the operator is not required to effect by hand the gripping contact of the stretching instrumentality with the band.

In a constructional form of the invention, the band-gripping means on each head consists of a pivoted member forming a jaw, which jaw coöperates with a second jaw formed by a part of the head, and the two said jaws act to firmly grip the band. The pivoted jaw is provided with a cam, the latter being positioned for contact with a movable part, the action of which moves the pivoted jaw or member into operative position for gripping the band.

The means for effecting the relative movement between the heads is a screw spindle, and with said spindle coöperates two of the aforesaid movable parts, the latter being so related to the spindle that said parts are actuated by the spindle when it is rotated, as a result of which the movable parts act upon the cams of the pivoted jaws in a manner to effect the movement of the jaws into gripping engagement with the band prior to, or at the time, the screw spindle acts upon the heads to effect the relative movement between said heads.

It is thus apparent that a single instrumentality, *i. e.* the screw spindle, actuates the gripping jaws and imparts movement to the heads, thus facilitating the operation of stretching the band around a shipping package.

Other features and advantages of the invention will appear from the following description taken in connection with the drawings, wherein—

Figure 1 is a side elevation of a band-stretching instrument embodying this invention.

Fig. 2 is a sectional plan view thereof, on the line 2—2 of Fig. 1, showing a portion of a shipping package.

Fig. 3 is an elevation looking at the right-hand end of Figs. 1 and 2.

In a practical embodiment of the invention, the tightening device consists of members or heads A and B, a guide stem C and a screw spindle D. The guide stem is attached to one head, as B, by a crosspin *c*, so that the stem is in fixed relation to said head, whereas the stem C and head A are slidably fitted together by passing the stem loosely through an opening in the head A, whereby the stem C operates to retain the heads A B in parallel relation.

Each of heads A and B is provided with a transverse opening *a* and in addition thereto each head is provided with a recess or guideway *b*, the recess of the head A being on the opposite side of the corresponding recess in the head B, as will be apparent by reference to Fig. 1.

E is a nut fitted loosely in the opening *a* of head A, said nut being provided with an axially threaded opening into which is screwed the threaded screw D. As shown, the screw D is provided with a single continuous thread, a part of the screw spindle being plain or smooth as at *d*. Said spindle is provided at one end portion thereof with a crank D' or other suitable device for imparting rotative movement to the screw.

F is a bushing fitted loosely in the opening $a$ of member or head B, and within this bushing is loosely journaled the smooth portion $d$ of screw spindle D, see Fig. 2.

The nut E and bushing F are provided with members G and H, respectively, each member being in the form of an oblong or rectangular plate, as shown more particularly in Fig. 3. The rectangular members or plates G and H are unitary with the nut and bushing, respectively, and said members or plates G and H are fitted loosely in the recesses $b$ of heads A B, respectively. The marginal portions of the members G and H are in contact with the edges or walls of the recesses $b$ so as to have a sliding fit therein, whereby the members G and H operate to restrain the nut E and bushing F from rotative movement within the heads A and B when the screw spindle is rotated, whereas the members G and H are adapted to have a limited sliding movement within the recesses $b$ of the heads A and B, which sliding movement is due to the action of the screw spindle upon the nut E and to the action of certain collars on the spindle upon the bushing F, as will hereinafter appear.

The heads A and B carry band-gripping devices I J, respectively, the same being pivotally supported upon the heads and being positioned in operative relation to the members G and H so as to be actuated thereby. Each band-gripping device is in the form of a plate fitted against one face or side of the head, said plate being provided with lugs or ears $i$ and being pivotally connected by a pin $j$ to the head, whereby the band-gripping plate is adapted for movement with the head and is capable of an independent pivotal movement relatively to said head.

Each head or member is provided in a lower corner thereof with a groove $k$, and the gripping plate positioned opposite to said groove $k$ is provided with a similar or complemental groove $l$, whereby the grooves $k$ and $l$ are in facing relation and in the lower portion of the head and the plate, so that a wire band resting in contact with the shipping package will be received within the grooves $k$ and $l$, as will more clearly appear by reference to Figs. 1 and 3.

The groove $k$ of each head thus constitutes a gripping jaw with which coöperates the groove of one plate, the latter acting as the complemental gripping jaw. The plates I and J extend upwardly for suitable distances above the pivotal pins $j$, and said plates are provided with beveled edge portions $m$ and $n$, the bevel $m$ on the gripping plate I being adjacent the sliding plate G, whereas the bevel $n$ on the gripping plate J is adjacent the slidable plate H. The sliding plates G and H are provided with beveled edges $o$ and $p^2$, respectively, and these beveled edges of the sliding plates are adapted for contact with the beveled edges $m$ and $n$ of the gripping plates I and J, respectively, see Fig. 2, whereby a cam action is secured by the contact of the sliding plates with the pivoted gripping plates upon the rotation of the screw spindle.

The screw D acts directly upon the nut E to impart a limited traveling movement to the nut and to the plate G, but as the screw is mounted loosely in the bushing F and moves endwise with the nut E for a limited distance, I find it desirable to employ collars L and M on the smooth portion $d$ of the screw spindle. As shown, the collar M is turned on or integral with the spindle, whereas the other collar L is made fast with the spindle by a set screw L'. The two collars are fast with the spindle near the respective ends of the bushing F and sliding plate H, and one or the other of these collars is adapted for engagement with the bushing F or plate H according to the direction in which the screw spindle is turned.

The device as thus far described is constructed for the band-gripping plates to be actuated automatically by the rotation of the screw spindle, so that it is not necessary for the operator to manipulate either of the clamps I and J to effect the engagement of said clamps with the band. Under some conditions, however, it may be desirable to manually operate the gripping plates I and J, for which purpose each plate is provided with a thumb screw O which is threaded into an opening tapped into the upper part of the plate, whereby the screw may be turned by hand into engagement with a part of the head A or B in order to turn the plate on its pivot and thereby bring the lower grooved part of the plate into position for gripping engagement with the band which is adapted to occupy the grooves $k$ and $l$.

Prior to using the instrument, the screw spindle is turned in one direction so as to impart sliding movement to nut E and plate G, the latter sliding within the recess $b$ of head A and holding nut E from rotation, but when the nut E and plate G are seated against further sliding movement with respect to head A, then the continued turning of screw D imparts a limited endwise movement to said screw, the effect of which is to withdraw collar M from contact with bushing F and to position the collar L into contact with the bushing so that the continued turning of the screw imparts movement to the bushing F and to the plate H. A wire band P is passed around the shipping package, the end portions $p$ and $p'$ of said band being in lapping relation. The device is placed upon the package with the clamps I and J in open positions, whereby the heads and the gripping members are adapted for engagement with the band near its end portions without lifting said band away from contact with the shipping package. The screw spindle is now turned in an opposite direction so as to impart sliding motion to the nut E and the plate G, the cam edge $o$ of which plate G rides on the cam edge $m$ of gripping plate I so as to move the latter into gripping engagement with one end portion of the wire band. The screw spindle is turned so that an endwise movement is given to the spindle for a limited distance in order to bring the collar M into contact with plate H, which movement results in the cam edge $p^2$ of the plate H sliding over the cam edge $n$ of the plate J, thereby turning the plate J so that said plate will coöperate with the head B in gripping the band near its other end portion. The band having been gripped by the automatic action of the screw spindle upon the two clamps, the operator continues to turn the screw spindle in a direction to move the head A toward the head B, thus stretching the band in two directions and drawing the band so tightly around the packing case as to partially embed said band within the material of the packing case, particularly at the corners thereof. At this stage of the operation the band for the major part of its length is drawn taut around the case, but the end portions of the band are free or loose, the instrument at this time occupying a spaced relation with respect to the loose ends of the band. The operator is thus enabled to place a sealing and anchoring member Q into engagement with the loose ends $p$ and $p'$ of the band, in the manner disclosed in application Serial No. 210,340 filed by the assignee herein. The major part of the band is under tension while the sealing device is being fitted upon the loose ends of the band and during the operations of driving said sealing device into the material of the packing case and attaching the end portions of the band to the sealing device. The mode of attaching the end portions of the band to the sealing device consists in bending the ends $p$ and $p'$ around corners of the sealing device, as illustrated in the upper right-hand portion of Fig. 2, the extreme end portions of said loose ends being tucked or inserted beneath the top of the sealing device. The band having been applied, stretched and fastened, the operator turns the screw spindle in a direction to release the gripping plates from contact with the stretched band, whereupon the entire device may be removed from contact with the package and the band.

It will be noted that in my instrument it is not necessary to lift the end portions of the band away from the shipping package in order to engage said end portions with the gripping devices of the stretching instrument, but, on the contrary, the band during the stretching operation is in contact with the shipping package at those portions of the band which are gripped by the stretching device, as a result of which there is no appreciable slackening in the tension of the band after securing the ends of said band and upon removing the stretching device.

Although I have shown and described the implement as embodying in its construction a screw spindle which is provided with a single or continuous thread, it is apparent that, should it be desired to expedite the operation, said screw spindle may be provided with a double thread, one of which threads is right handed and the other left handed.

Having thus fully described the invention, what I claim as new, and desire to secure by Letters Patent is:

1. A band tightener embodying a plurality of heads each provided with band-gripping jaws, a spindle for moving the heads relatively one to the other, and means for opening and closing the band-gripping jaws of said heads, said opening and closing means being actuated by the rotation of said spindle and said opening and closing means being effective in actuating the gripping jaws successively on the said heads.

2. A band tightener embodying a plurality of heads each provided with a plurality of band-gripping jaws, a spindle, means operated by a rotative movement of the spindle for imparting relative movement to said heads whereby the heads approach and recede with respect one to the other, and jaw operating means actuated by a rotative movement of said spindle for opening or closing the band-gripping jaws of one head subsequently to the operation of opening and closing the band-gripping jaws of the other head.

3. A band tightener embodying a plurality of heads each provided with a fixed jaw, a screw spindle and means coacting therewith for effecting relative movement between said heads whereby the heads are caused to approach and recede relatively one to the other, a plurality of movable jaws one pivoted to each head in position for coöperation with the fixed jaw on said head, and jaw-operating means actuated successively by the rotation of the spindle for opening and closing the movable jaw of one head subsequently to the operation of opening or closing the movable jaw of the other head.

4. A band tightener embodying a plurality of heads each provided with a fixed jaw, a screw spindle and means coacting therewith for effecting relative movement between said heads whereby the heads are caused to approach and recede relatively one to the other, a plurality of movable jaws one pivoted to each head in position for coöperation with the fixed jaw on said head, and cam-actuated means operated by the rotative movement of the spindle and coöperating directly with the movable jaws for opening and closing said movable jaws relatively to the fixed jaws of said head, said cam-actuated means under the influence of the spindle being effective in closing the band-gripping jaws prior to a relative movement between the two heads.

5. A band tightener embodying a plurality of heads each provided with a fixed jaw, a screw spindle and means coacting therewith for effecting relative movement between said heads whereby the heads are caused to approach and recede relatively one to the other, a plurality of movable jaws one pivoted to each head in position for coöperation with the fixed jaw on said head, jaw-operating members slidably fitted to said heads and operable by the rotative movement of said screw spindle and means whereby the sliding movement of said jaw operating members is communicated to the movable jaws for opening and closing the same.

6. A band tightener embodying a plurality of heads each provided with a fixed jaw, a screw-spindle and means coacting therewith for effecting relative movement between said heads whereby the heads are caused to approach and recede relatively one to the other, a plurality of movable jaws one pivoted to each head in position for coöperation with the fixed jaw on said head, jaw operating members movable relatively to the heads, means operated by the rotation of the screw spindle for imparting movement to said jaw operating members, and cam faces on the jaw operating members and the movable jaws whereby said movable jaws are opened and closed relatively to the fixed jaws by the rotation of the screw spindle.

7. A band tightener embodying heads provided with pivoted grippers, said heads and grippers being provided in the under faces thereof with means for receiving a band, combined with a screw spindle having a limited longitudinal movement relative to one of said heads and for directly actuating another of the heads whereby a relative movement is effected between the heads, said screw-spindle operating to successively move the pivoted grippers into coöperative relation to the directly actuated head and the slidably engaged head.

8. A band tightener embodying a plurality of heads, band-grippers carried thereby, a nut slidingly fitted to the head, a bushing slidingly fitted to the other head, a spindle coöperating with the nut and the bushing, and means unitary with the nut and the bushing for actuating the band-grippers by the sliding travel of the spindle with the heads.

9. A band tightener embodying a plurality of heads, band-grippers carried thereby, cam devices slidably mounted in said heads and coöperating with said band-grippers, and an operating member having a combined rotary and sliding movement relatively to said heads, the sliding movement of which member actuates said cam devices and the rotary movement thereof imparts movement to the heads relatively to each other.

10. A band tightener embodying a plurality of heads provided with pivoted grippers, cam plates slidably mounted on said heads for actuating said grippers, and a screw-spindle having a sliding movement relative to one head and operating to directly actuate the other head to thereby produce a relative movement between the heads, said heads having means mounted therein capable of endwise movement by the screw to effect a sliding travel of the cam plates for actuating the pivoted grippers.

In testimony whereof I have hereunto signed my name.

VINCENT RAGONA.